United States Patent [19]

Schaffer

[11] Patent Number: 4,945,717
[45] Date of Patent: Aug. 7, 1990

[54] GRASS CUTTER CARRIAGE

[76] Inventor: Norman G. Schaffer, 24 Greenleaf St., Emmaus, Pa. 18049

[21] Appl. No.: 248,990

[22] Filed: Sep. 26, 1988

[51] Int. Cl.$^5$ ............................................ A01D 34/03
[52] U.S. Cl. .................................... 56/17.2; 56/17.1
[58] Field of Search ................... 56/17.1, 17.2, 17.5, 56/16.7, 16.9, 255; 280/242 WC, 247.13 R, 661

[56] References Cited

U.S. PATENT DOCUMENTS

| | | | |
|---|---|---|---|
| 2,489,730 | 11/1949 | Soenksen | 56/17.2 |
| 2,504,259 | 4/1950 | Ford | 56/17.4 |
| 2,977,740 | 4/1961 | King | 56/17.2 |
| 3,971,196 | 7/1976 | Stevenson | 56/255 |
| 4,112,656 | 9/1978 | Ranko | 56/16.9 |
| 4,182,100 | 1/1980 | Letter | 56/16.7 |
| 4,287,709 | 9/1981 | Lowry | 56/17.5 |
| 4,341,060 | 7/1982 | Lowry | 56/17.5 |
| 4,343,139 | 8/1982 | Lowry | 56/17.5 |
| 4,351,143 | 9/1982 | Lessig | 56/17.5 |
| 4,389,836 | 6/1983 | Lowry | 56/17.5 |
| 4,411,126 | 10/1983 | Lowry | 56/17.5 |
| 4,422,283 | 12/1983 | Scanland | 56/17.2 |
| 4,428,183 | 1/1984 | Lowry | 56/17.5 |
| 4,688,376 | 8/1987 | Wolfe, Sr. | 56/17.2 |
| 4,756,147 | 7/1988 | Savell | 56/255 |

Primary Examiner—Jerome W. Massie, IV
Assistant Examiner—Gay Spahn
Attorney, Agent, or Firm—Leon Gilden

[57] ABSTRACT

A grass cutter carriage is set forth wherein a conventional lawn mower is securable within an adjustable rectangular framework. A pair of laterally positioned wheels to said framework are pivotally mounted wherein the noted wheel height locations can be readily changed through the use of a unique hinged support. The intent of this improved design carriage is to extend the use of existing commercially available rotary grass mowers to enable their use to cut tall grass, weeds and other vegetation in open rock strewn field with terrain not compatible to existing rotary grass lawn mowers.

In addition, the carriage is configured to accommodate a wide range of mower and mower wheel sizes without demanding modification of the existing mowers.

6 Claims, 5 Drawing Sheets

GRASS CUTTER CARRIAGE

BACKGROUND OF THE INVENTION

1. Field of the Invention

The field of invention relates to grass cutting apparatus and more particularly pertains to a new and improved grass cutter carriage for use in combination with a conventional lawn mower for trailering and supportively positioning a conventional commercially available lawn mower at predetermined positions relative to high grass, weeds or other vegetation to be cut in open field terrain other than level lawns.

2. Description of the Prior Art

The use of grass cutting apparatus is well known in the prior art. As may be appreciated, these devices have normally been specialized for particular usage, such as conventional light duty lawn mowers for the cutting of conventional lawns and the use of heavy duty equipment for the cutting of field weeds and the like where elevated grass cutting positions and orientations relative to ground contour are desirable, but proportionately increase the expense and complexity of grass cutting equipment. For example, U.S. Pat. No. 2,504,259 to Ford illustrates the use of a commercial type grass cutting apparatus wherein a pair of laterally positioned relatively large wheels are utilized for the securement of a motor to power a forwardly oriented grass cutting arrangement to enable the noted arrangement to accommodate variations in slope and contour of an associated ground to be mowed. While the Ford patent is an effective solution for the accommodation of varying ground contours, the apparatus is generally of the elaborate and costly commercial type device that the instant invention has been developed to overcome.

U.S. Pat. No. 2,977,740 to King illustrates the use of an auxiliary wheel or wheel pair securable to an existing lawn edger for accommodation of varying ground heights whereby an offset curbing arrangement is accommodated by the King patent wherein the auxiliary wheel arrangement enables trimming of grass proximate conventional road curbing. The King patent, while being an effective solution for edge trimming, is of an organization and arrangement of interest only to the illustration of a need for accommodation of edge trimming proximate conventional street curbing.

U.S. Pat. No. 4,182,100 to Letter utilizes a tri-wheeled carriage supportingly securing a nylon line-type grass cutting device wherein &he carriage supportingly secures the grass cutting device at fixed elevations proximate ground level to ostensibly enhance the flexibility and usage of such cutting arrangements. The instant carriage invention relates to rotary lawnmowers as does the Letter device to string "String Weed Wackers"; however, the instant carriage with the rotary mower is vastly more efficient than the Letter device.

U.S. Pat. No. 4,411,126 to Lowry illustrates the use of a four-wheeled carriage formed with a platform for securement of a motor to which a grass cutting blade may be attached wherein the motor supportive framework has laterally securable axles for selectively varying the spacing of the fore and aft positioned support wheels. Further, gripping devices are provided for holding a platform in a desired position on the frame, as well as adjusting the frame relative to the ground by use of adjustable "L" shaped axles supporting said wheels. While of interest relative to a unique grass cutting organization, the apparatus and arrangement of Lowry is of a structurally dissimilar organization and highly impractical for high weeds in rock strewn uneven field terrain relative the instant invention.

U.S. Pat. No. 4,428,183 to Lowry sets forth a carriage for use in grass trimming wherein a rotative cutting element utilizing a length of cord includes a platform for mounting wheels wherein the wheels are selectively adjustable for height and orientation relative the ground to accommodate varying grass cutting positions. An attachment is available for angulated or raised height cutting of a particular ground to be mowed, if desired. As a grass cutting instrument, the patent to Lowry is of interest relative to the relativelY elaborate structure presented, but falls short in function and organization to the instant invention.

As such, it may be appreciated that there is a continuing need for a new and improved grass cutter carriage which is compatible to a wide range of commercially available lawn mowers offering a wider usefulness of such mowers at a suitable cost/benefit rate as efficient open field, high grass and weed mowers in terrain not compatible to the present standard commercially available rotary mower.

SUMMARY OF THE INVENTION

In view of the foregoing disadvantages inherent in the known types of grass cutter carriage organizations now present in the prior art, the present invention provides an grass cutter carriage wherein the same may be easilY and efficiently transported, disassembled and stored during periods of non-use and the same may be readily adjusted for selective height engagement of a secured lawn mower relative to high grass or weeds and the like to be cut. As such, the general purpose of the present invention, which will be described subsequently in greater detail, is to provide a new and improved grass cutter carriage which has all the advantages of the prior art grass cutting arrangements and none of the disadvantages.

To attain this, the present invention comprises a grass cutter carriage apparatus which supportingly encompasses a conventional lawn mower for transport thereof during periods of non-use as a lawn mower and provided with pivotally adjustable, laterally mounted wheels for selective adjustment of the carriage and the associated lawn mower for accommodation of various cutting heights and ground contours. A rectangular low silhouette adjustable framework permitting the lawn mower to be driven onto (without physical lifting) is provided to accommodate a variety of lawn mowers with associated overlying longitudinal straps for enhancing stability of a secured lawn mower within the framework. The design also permits the use of the lawn mower handle and controls without modifications or changes to the mower. This provides a greater cost/benefit for the user.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is of enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims. nor is it intended to be limiting as to the scope of the invention in any way.

It is therefore an object of the present invention to provide a new and improved grass cutter carriage which has all the advantages of the prior art grass cutter carriages and none of the disadvantages.

It is another object of the present invention to provide a new and improved grass cutter carriage which may be easily and efficiently manufactured and marketed.

It is a further object of the present invention to provide a new and improved grass cutter carriage which is of a durable and reliable construction.

An even further object of the present invention is to provide a new and improved grass cutter carriage which is susceptible of a low cost of manufacture with regard to both materials and labor, and which accordingly is then susceptible of low prices of sale to the consuming public, thereby making such grass cutter carriages economically available to the buying public.

Still yet another object of the present invention is to provide a new and improved grass cutter carriage which provides in the apparatuses and methods of the prior art some of the advantages thereof, while simultaneously overcoming some of the disadvantages normally associated therewith.

Still another object of the present invention is to provide a new and improved grass cutter carriage wherein a multi-adjustable framework is provided for accommodation of a variety of conventional lawn mowers including existing power propelled mowers and the transmission of their power to power propel the instant carriage.

Yet another object of the present invention is to provide a new and improved low silhouette enabling mower drive on (no physical lifting) grass cutter carriage wherein forward and rearward adjustable bracketry without restricting the mower wheels rotation and associated longitudinal strapping is provided for insuring stability of a secured lawn mower within the framework of the instant invention.

Even still another object of the present invention is to provide a new and improved grass cutter carriage wherein laterally secured adjustable wheels positionable for height and accommodation of ground contour is provided.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
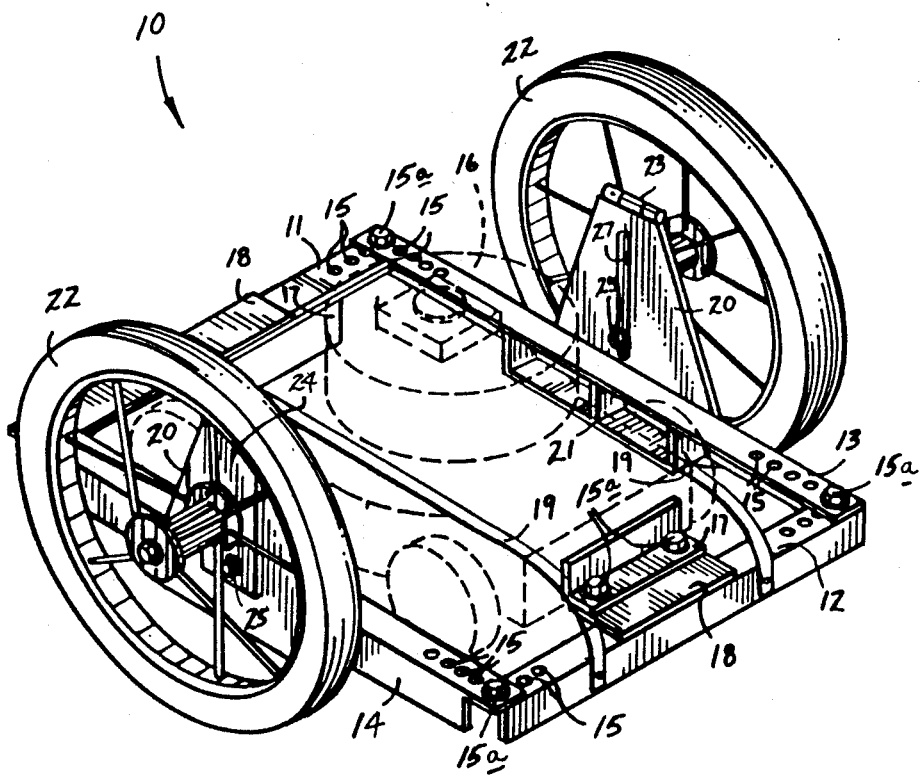
FIG. 1 is an isometric illustration of the instant invention.

With reference now to the drawings, and in particular to FIGS. 1 to 10 thereof, a new and improved grass cutter carriage embodying the principles and concepts of the present invention and generally designated by the reference numeral 10 will be described.

More specifically, it will be noted that the grass cutter carriage apparatus 10 essentially comprises a framework including a rear frame member 11, a forward frame member 12, a left frame member 13, and a right frame member 14. The respective frame members are each formed with apertures 15 through a top surface proximate each terminal end of each frame member. The apertures, when aligned, cooperate with conventional fasteners 15a to enable adjustment to accommodate a variety of conventional lawn mowers 16, as illustrated in phantom throughout the various figures. The assembly may be manually manipulated by use of a conventional handle "H" (FIG. 1).

Figure 2:
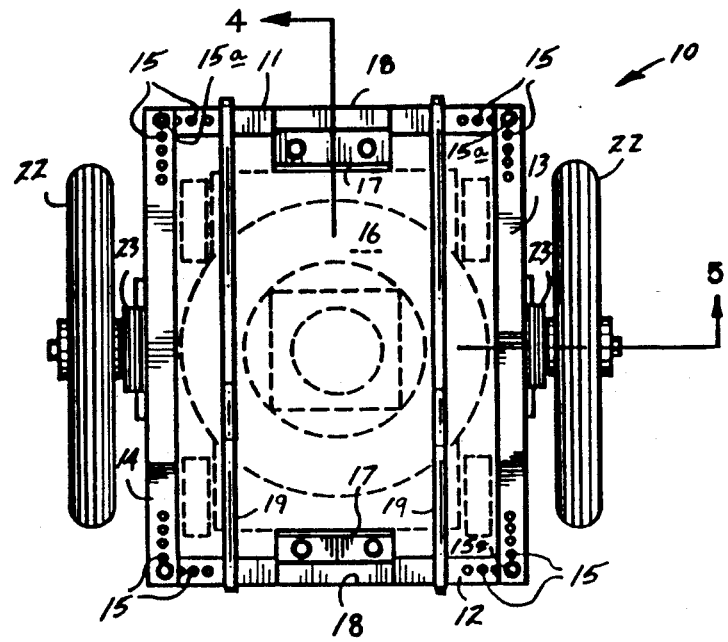
FIG. 2 is a top orthographic illustration of the instant invention.
Figure 3:
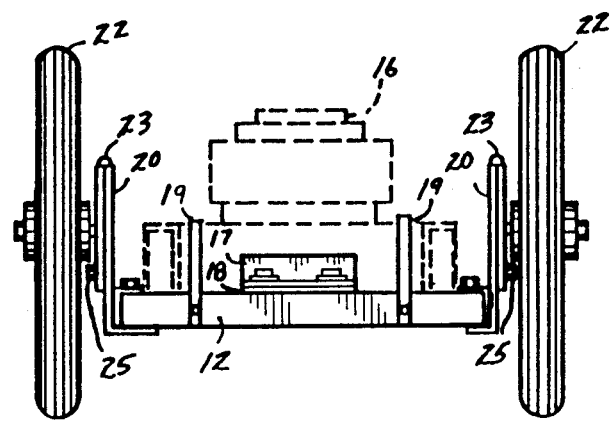
FIG. 3 is an orthographic illustration taken in elevation of the instant invention.
Figure 4:
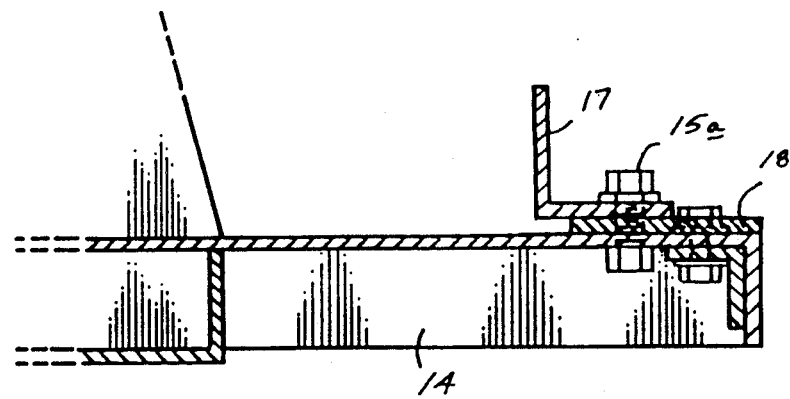
FIG. 4 is a partial sectional view taken along the line Section 4 of FIG. 2 in the direction indicated by the arrow.
Figure 6:
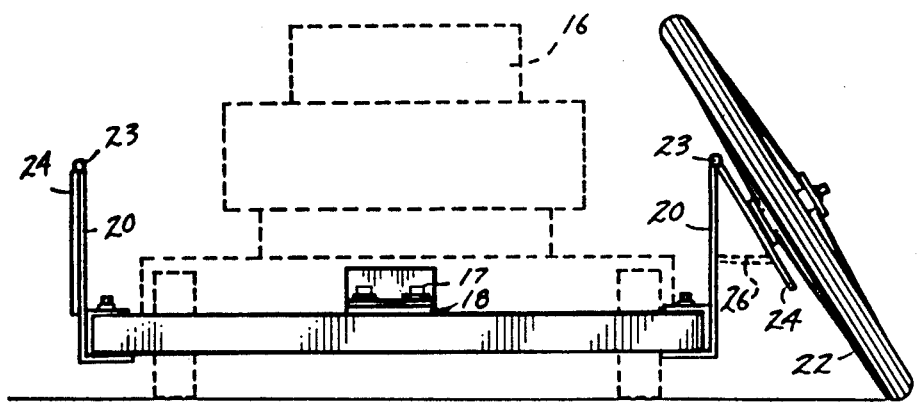
FIG. 6 is an orthographic view taken in elevation illustrating the easy loading of driving into the low silhouette carriage and adjustment of the instant invention without physical lifting effort by the user of the instant invention.

A lawn mower 16 once accommodated within the perimeter of a framework formed by the various frame members, a forward and rear "L" shaped securement member 17 is securable at a forward and rear respective surface of the lawn mower and is secured thereto by any number of commercially available fasteners and wherein the "L" shaped securement member 17 is advantageously adjustable relative to a slotted plate member 18 which in turn is interiorly secured to a respective forward and rear member 11, 12, as illustrated in FIGS. 1, 2 and 4. Additionally, longitudinal adjustable securement straps 19 are each positioned beyond either terminal edge of the "L" shaped secure member 17 and plate member 18 for overlying engagement with the lawn mower 16 to enhance stability and limit vibrational stress imparted to the "L" shaped securement members 17. The longitudinal securement straps 19 are in turn secured to the forward and rear frame members 12 and 11 respectively by conventional fasteners. It should be noted, as illustrated in FIG. 6, whereupon securement members 17 will be adjusted longitudinally of the lawnmower by the slots in plate member 18 to accommodate the lawnmower.

Figure 5:
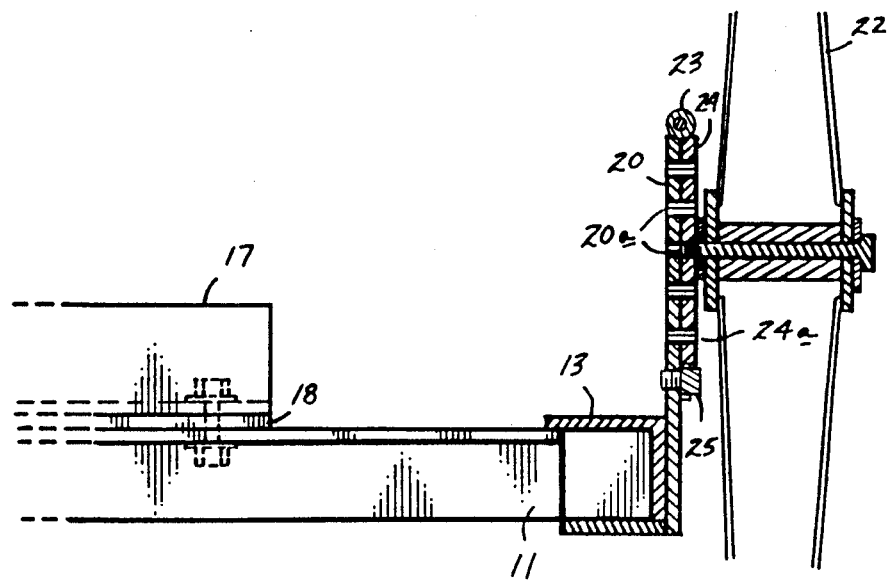
FIG. 5 is an orthographic partial sectional view taken along the line 5 of FIG. 2 in the direction indicated by the arrow.

A plurality of support plates 20 are positioned medially to the exterior of the right and left frame members 14 and 18 respectively formed with vertical slot 27, as illustrated in FIG. 5, to cooperate with wheel bracket 24 and the wheel bracket apertures 24a. The right and left frame members 14 and 13 are each formed with a re-enforcement bracket 21, as illustrated in FIG. 1, to enhance the integrity of securement of the respective support plates 20 to their respective frame members.

It should be further pointed out that the transport wheels 22 secured by means of respective wheel fasteners 25 axially through the transport wheels 22 and secured to the associated wheel brackets 24 and support plates 20, are positioned medially of respective right and left frame members 18 and 14 to balance the apparatus and enable ease of manipulation during its use.

Figure 7:
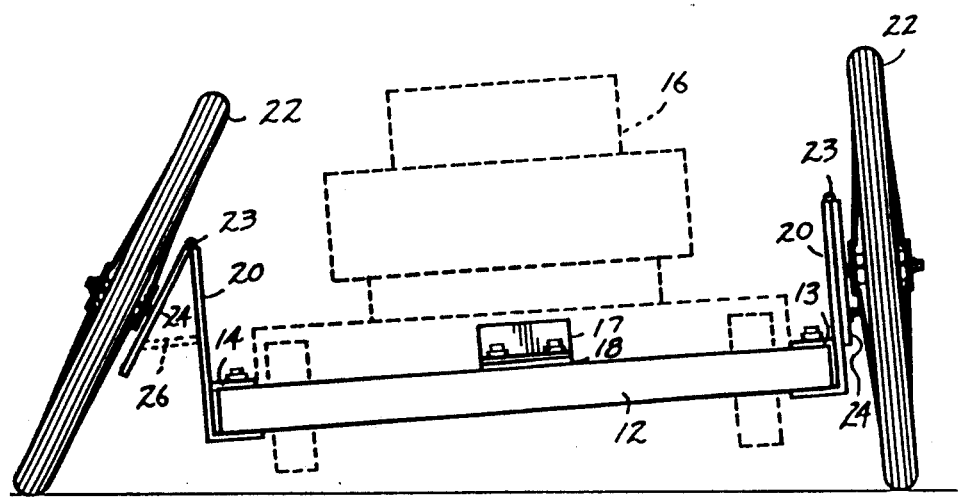
FIG. 7 is an orthographic view taken in elevation of the instant invention illustrating a further adjustment of the easy wheel attachment and subsequent changes of wheel height positions through the unique hinged support of the instant invention.
Figure 8:
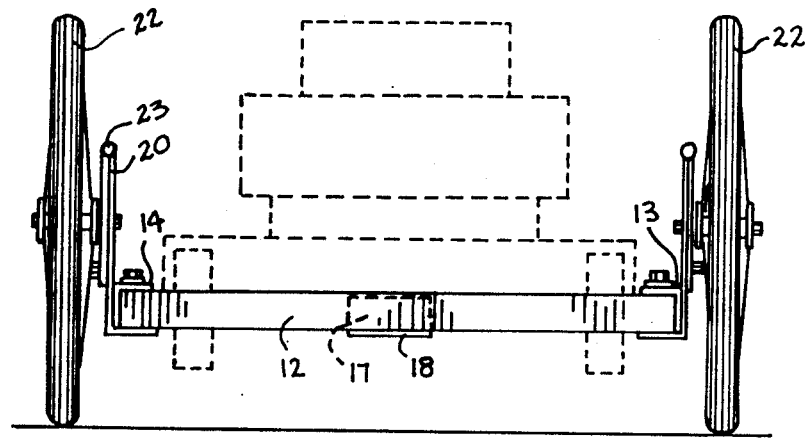
FIG. 8 is an orthographic view taken in elevation of the instant invention illustrating the wheels in a fixed vertical running position.

A hinge 28 is secured to support plate 20 and wheel bracket 24 to enable pivotment therebetween for purposes as will be subsequently discussed. Reference to FIGS. 6, 7, and 8 illustrate the carriage in its various modes of operation whereupon the FIG. 6 illustration notes the removal of the transport wheels 2 enabling the ready accommodation of the associated lawn mower 16 onto the interior of the perimeter of the carriage whereupon it may be secured thereto by means of the associated straps 19, and the "L" shaped securement member 17, per discussion in illustration reference to FIG. 4.

A further accommodation of the lawn mower 16 may be found in reference to FIG. 7 whereupon the transport wheels 22 are not removed, but merely the wheel fastener securement nuts are removed enabling the outward pivotment of the wheels 22 as well as the wheel brackets 24 pivoted outwardly relative to the support plates 20. This further enables a cutting height adjustment whereupon repositioning of the wheel brackets 24 relative to the support plates 20 by means of the hinge 28, the wheel fastener 25 may be positioned in any one of the apertures 24a (FIG. 5) and thereafter resecured through the associated slot 27 formed within support plates 20 to provide an erected structure, as illustrated in FIG. 8.

In this manner the wheels 22 may be positioned to enable a variety of cutting heights. These changes can be accomplished with relative ease through the hinged wheel support 24.

FIG. 7 illustrates the method of changing wheel heights on the instant invention using predetermined threaded hole locations in the hinged support 24 thus enabling the selection of various cutting heights.

FIG. 8 illustrates the instant invention in the running position.

Figure 9:
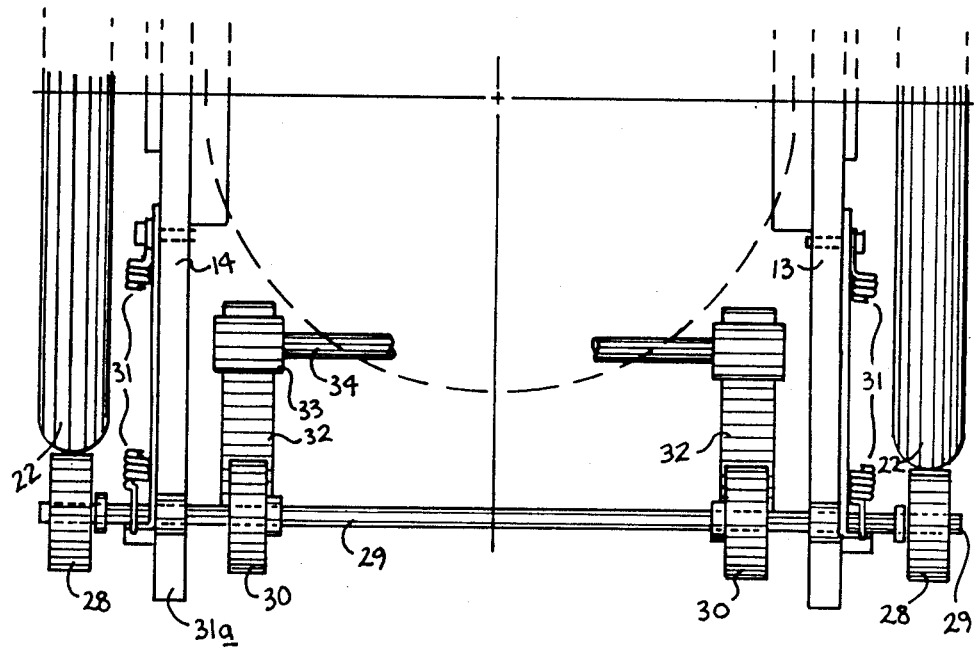
FIG. 9 is a top plan view of the instant invention illustrating its adaptability to power propelled commercially available lawn mowers to power the instant invention without modifying or changing the power mower.

FIG. 9 is a plan view of the instant invention illustrating the unique design permitting the transmission of power to the instant carriage from commercially available power propelled lawn mowers without modification of the existing mower.

Figure 10:
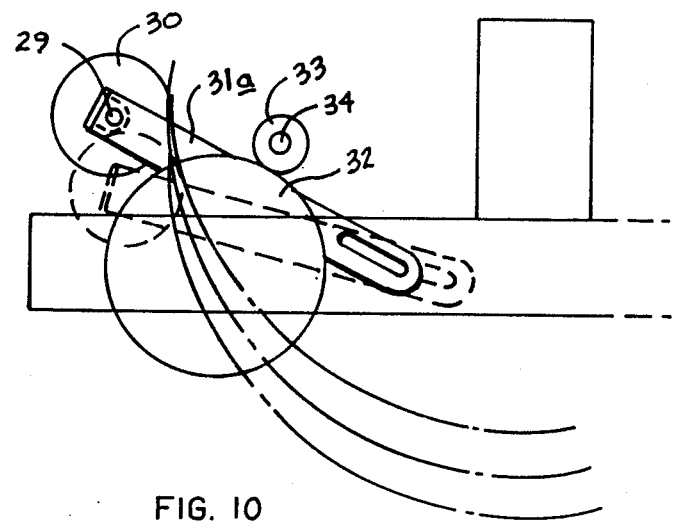
FIG. 10 is a side view taken in elevation of FIG. 9 illustrating accommodation of various mower sizes and various mower wheel sizes.

FIG. 10 is an end side elevation of the instant invention showing the ready adaptability to mower sizes 20 inches to 22 inches and related mower wheel sizes 5 inch to 8 inch diameters.

With reference to FIGS. 9 and 10 illustrate a modification of the instant invention whereupon the apparatus accommodates "self-propelled" lawn mowers that typically utilize a power shaft 84 oriented transversely of the lawn mower and formed with integral cogged output wheels 88 to drive the lawn mower wheels 82. The instant invention utilizes a driven shaft 29 formed with inner drive wheels 80 to pivotally and frictionally engage the associated lawn mower wheels 32. Exteriorly formed outer drive wheels 28 are positioned on the drive shaft 29 and frictionally engage the transport wheels 22 to effect motive power to the instant invention.

A pivoted link 31a is positioned between each outer drive wheel 28 and inner drive wheel 80 and is formed with a rearwardly slotted portion which is secured to a respective right and left frame member 13 and 14 with a spring 31 secured between the frame member 13 and 14 at a forward portion of the pivoted link 31a. In this manner, the pivoted link 31a and the associated drive wheels are maintained in frictional contact with the respective lawn mower and transport wheels 82 and 22 respectively.

As to the manner of usage and operation of the present invention, the same should be apparent from the above description. Accordingly, no further discussion relative the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents maY be resorted to, falling within the scope of the invention.

What is claimed as being new and desired to be protected by letters patent of the U.S. is as follows:

1. A grass cutter carriage apparatus for use in combination with a lawn mower, said lawn mower including a housing, a plurality of wheels, a motor and cutting blade where said grass cutter carriage apparatus comprises, a frame means for accepting said lawn mower therein and including fastening means for adjustably fastening said lawn mower within said frame means, said frame means further including a plurality of elongate frame members encircling said lawn mower, and support plate means for adjustably securing a plurality of carriage wheels to said frame means, and wherein said support plate means comprises two support plates, each of said support plates secured at opposite sides of said frame means, and wherein said elongate frame members are formed with apertures proximate their terminal ends and are secured to one another by fasteners to form a rectangular framework, and wherein each support plate has hingedly secured thereto a wheel bracket wherein each wheel bracket has a carriage wheel rotatably secured thereto and further including fastening means axially and rotatably supporting said carriage wheel to adjustably position each wheel with respect to each support plate.

2. A grass cutter carriage apparatus as set forth in claim 1 wherein said frame means further includes a plurality of longitudinal strap means for overlying said lawn mower and formed with terminal ends secured to said frame means and wherein said securement strap means are positioned parallel to said carriage wheels.

3. A grass cutter carriage apparatus as set forth in claim 2 wherein said fastening means includes a forward and rear "L" shaped securement member attachable to said lawn mower and adjustably positionable and securable to a slotted plate member wherein said plate member is securable to a forward and rear frame member.

4. A grass cutter carriage apparatus as set forth in claim 3 wherein support plate member includes a plurality of apertures within said wheel bracket accepting said wheel in several predetermined locations to vary the cutting heights.

5. A grass cutter carriage as set forth in claim 1 wherein said carriage wheels are of a diameter at least several times a diameter of said lawn mower wheels.

6. A grass cutter carriage apparatus as set forth in claim 1 wherein a plurality of slotted links are resiliently mounted relative to side frame members of said frame means wherein said pivoted links rotatablY secure a driven shaft, said driven shaft includes driven wheels positioned interiorly of said pivoted links for engagement with forward driven wheels of said lawn mower, and wherein said drive shaft further includes outer driven wheels positioned exteriorly of said pivoted links wherein said outer driven wheels are engagedly positioned with said carriage wheels to drive said carriage wheels.

* * * * *